(12) United States Patent
Price

(10) Patent No.: US 9,104,982 B2
(45) Date of Patent: Aug. 11, 2015

(54) PREVENTION OF INVALID SELECTIONS BASED ON MACHINE LEARNING OF USER-SPECIFIC LATENCY

(71) Applicant: Google Inc., Mountain View, CA (US)

(72) Inventor: Thomas Graham Price, San Francisco, CA (US)

(73) Assignee: Google Inc., Mountain View, CA (US)

( * ) Notice: Subject to any disclaimer, the term of this patent is extended or adjusted under 35 U.S.C. 154(b) by 323 days.

(21) Appl. No.: 13/840,381

(22) Filed: Mar. 15, 2013

(65) Prior Publication Data

US 2015/0170050 A1 Jun. 18, 2015

(51) Int. Cl.
*G06F 15/18* (2006.01)
*G06N 3/00* (2006.01)
*G06N 99/00* (2010.01)

(52) U.S. Cl.
CPC .................................... *G06N 99/005* (2013.01)

(58) Field of Classification Search
None
See application file for complete search history.

(56) References Cited

U.S. PATENT DOCUMENTS

| | | | |
|---|---|---|---|
| 8,542,196 B2 | 9/2013 | Pallakoff | |
| 8,660,978 B2 | 2/2014 | Hinckley et al. | |
| 2006/0197753 A1 | 9/2006 | Hotelling | |
| 2007/0152976 A1 | 7/2007 | Townsend et al. | |
| 2008/0091450 A1* | 4/2008 | Arima et al. | 705/1 |
| 2009/0106224 A1* | 4/2009 | Roulland et al. | 707/5 |
| 2010/0332876 A1* | 12/2010 | Fields, Jr. et al. | 713/323 |
| 2013/0265269 A1 | 10/2013 | Sharma et al. | |

* cited by examiner

*Primary Examiner* — Li-Wu Chang
(74) *Attorney, Agent, or Firm* — Fish & Richardson P.C.

(57) ABSTRACT

The specification relates to a client device utilizing an unintentional-selection module that disambiguates selection events for temporally proximate content. The client device records time stamps indicating a time a dynamic list is first presented and instances when the dynamic list is updated. An input selection indicating that a suggested search query has been chosen from the dynamic list of search suggestions is received and a time stamp for the input selection is recorded. A determination is made to see if the input selection is an unintentional selection. The input selection is determined as the unintentional selection when a difference between a time stamp for presenting a most recent dynamic list update and the time stamp of the input selection satisfies a user-specific threshold. The user-specific threshold is calculated with a machine learning system using user-specific latency times as training data.

20 Claims, 8 Drawing Sheets

PREVENTION OF INVALID SELECTIONS BASED ON MACHINE LEARNING OF USER-SPECIFIC LATENCY

BACKGROUND

The subject matter described herein relates to a prevention of invalid selections based on machine learning of user specific latency. Search engines provide a powerful tool for locating resources in large data repositories, e.g., resources on the Internet or resources stored on computer networks. These resources can be located in response to a search query submitted by a user.

In one approach to entering queries, the user enters a query by adding successive search terms until all search terms are entered. Once the user signals that all of the search terms of the query are entered, the query is sent to a search engine. The user may have alternative ways of signaling completion of the query by, for example, entering a return character by pressing the enter key on a keyboard, or by clicking on a search button on a screen with a finger gesture. Once the query is received, the search engine processes the search query, searches for resources responsive to the search query, and returns resources to a client device of the user.

In another approach, a search system can monitor the input of a search query by a user. Before the user finishes entering the search query, the search system can create a set of suggested queries. The suggested queries can be sent to a client device for possible selection by the user. If one of the suggested queries is selected, the search engine processes the selected search query, searches for resources responsive to the selected search query, and returns resources to a client device of the user. In another approach, the search engine can process suggested search queries without receiving any selection input. In this approach, the search engine can process the suggested query based on a high confidence of a guess performed by the search system.

SUMMARY

A user-specific system identifies and prevents invalid selections of temporally proximate content, e.g., a link that has recently changed on screen.

In one implementation, the methods comprise the steps of recording time stamps indicating a time a dynamic list is first presented and instances when the dynamic list is updated; receiving an input selection, the input selection indicating that a suggested search query has been chosen from the dynamic list of search suggestions; recording a time stamp for the input selection; and determining if the input selection is an invalid selection, the input selection being determined as the invalid selection when a difference between a time stamp for presenting a most recent dynamic list update and the time stamp of the input selection satisfies a user-specific threshold, the user-specific threshold being calculated with a machine learning system using user-specific latency times and/or device-specific latency times as training data. The user-specific threshold can be a function of time versus a probability of being invalid.

The method is also capable of replacing the suggested search query with a previously suggested search query if the selection was invalid and/or, presenting the suggested search query and a previously suggested search query if the selection is indeterminable, In another implementation, a system can comprise one or more processors and one or more computer-readable storage mediums containing instructions configured to cause the one or more processors to perform operations. The operations can include: recording time stamps indicating a time a dynamic list is first presented and instances when the dynamic list is updated; receiving an input selection, the input selection indicating that a suggested search query has been chosen from the dynamic list of search suggestions; recording a time stamp for the input selection; and determining if the input selection is an invalid selection, the input selection being determined as the invalid selection when a difference between a time stamp for presenting a most recent dynamic list update and the time stamp of the input selection satisfies a user-specific threshold, the user-specific threshold being calculated with a machine learning system using user-specific latency times and/or device-specific latency times as training data. The user-specific threshold can be a function of time versus a probability of being invalid.

The system is capable of replacing the suggested search query with a previously suggested search query if the selection was invalid and/or, presenting the suggested search query and a previously suggested search query if the selection is indeterminable.

In another implementation, a computer-program product can be tangibly embodied in a machine-readable storage medium and include instructions configured to cause a data processing apparatus to: record time stamps indicating a time a dynamic list is first presented and instances when the dynamic list is updated; receive an input selection, the input selection indicating that a suggested search query has been chosen from the dynamic list of search suggestions; record a time stamp for the input selection; and determine if the input selection is an invalid selection, the input selection being determined as the invalid selection when a difference between a time stamp for presenting a most recent dynamic list update and the time stamp of the input selection satisfies a user-specific threshold, the user-specific threshold being calculated with a machine learning system using user-specific latency times and/or device-specific latency times as training data. The user-specific threshold can be a function of time versus a probability of being invalid.

The product is capable of replacing the suggested search query with a previously suggested search query if the selection was invalid and/or, presenting the suggested search query and a previously suggested search query if the selection is indeterminable.

In one implementation, the methods comprise the steps of: establish a user profile in connection with a specific client device; receive a plurality of time stamps indicating times between updates for every dynamic list of search suggestions as received by the specific client device; receive a plurality of time stamps indicating each time a link is chosen from the dynamic list of search suggestions; receive a plurality of time stamps indicating each time an action signifying an invalid selection is performed after the link is chosen from the dynamic list of search suggestions; use a computer-implemented learning system to determine a user-specific threshold for an invalid selection, the user-specific threshold for the invalid selection being a function of time versus a probability of being invalid, the function of time being a difference between a time stamp for presenting a most recent dynamic list update and a time stamp for an input selecting a search suggestion, the input being invalid when the difference satisfies the user-specific threshold; establish an invalid-selection module based upon attributes learned by the system, the module determining a probability a selection is invalid; and send the invalid-selection module to the specific client device.

The method is capable of receiving at least one of a user's age, a type of device, a type of connection, a network carrier, a user location, and a signal strength.

In another implementation, a system can comprise one or more processors and one or more computer-readable storage mediums containing instructions configured to cause the one or more processors to perform operations. The operations can include: establish a user profile in connection with a specific client device; receive a plurality of time stamps indicating times between updates for every dynamic list of search suggestions as received by the specific client device; receive a plurality of time stamps indicating each time a link is chosen from the dynamic list of search suggestions; receive a plurality of time stamps indicating each time an action signifying an invalid selection is performed after the link is chosen from the dynamic list of search suggestions; use a computer-implemented learning system to determine a user-specific threshold for an invalid selection, the user-specific threshold for the invalid selection being a function of time versus a probability of being invalid, the function of time being a difference between a time stamp for presenting a most recent dynamic list update and a time stamp for an input selecting a search suggestion, the input being invalid when the difference satisfies the user-specific threshold; establish an invalid-selection module based upon attributes learned by the system, the module determining a probability a selection is invalid; and send the invalid-selection module to the specific client device.

The system is capable of receiving at least one of a user's age, a type of device, a type of connection, a network carrier, a user location, and a signal strength.

In another implementation, a computer-program product can be tangibly embodied in a machine-readable storage medium and include instructions configured to cause a data processing apparatus to: establish a user profile in connection with a specific client device; receive a plurality of time stamps indicating times between updates for every dynamic list of search suggestions as received by the specific client device; receive a plurality of time stamps indicating each time a link is chosen from the dynamic list of search suggestions; receive a plurality of time stamps indicating each time an action signifying an invalid selection is performed after the link is chosen from the dynamic list of search suggestions; use a computer-implemented learning system to determine a user-specific threshold for an invalid selection, the user-specific threshold for the invalid selection being a function of time versus a probability of being invalid, the function of time being a difference between a time stamp for presenting a most recent dynamic list update and a time stamp for an input selecting a search suggestion, the input being invalid when the difference satisfies the user-specific threshold; establish an invalid-selection module based upon attributes learned by the system, the module determining a probability a selection is invalid; and send the invalid-selection module to the specific client device.

The product is capable of receiving at least one of a user's age, a type of device, a type of connection, a network carrier, a user location, and a signal strength.

One or more of the implementations of the subject matter described herein may provide one or more of the following advantages. The subject matter described herein presents accurate queries to search systems when a query is chosen from a suggested query list unintentionally.

DETAILED DESCRIPTION

Figure 1:
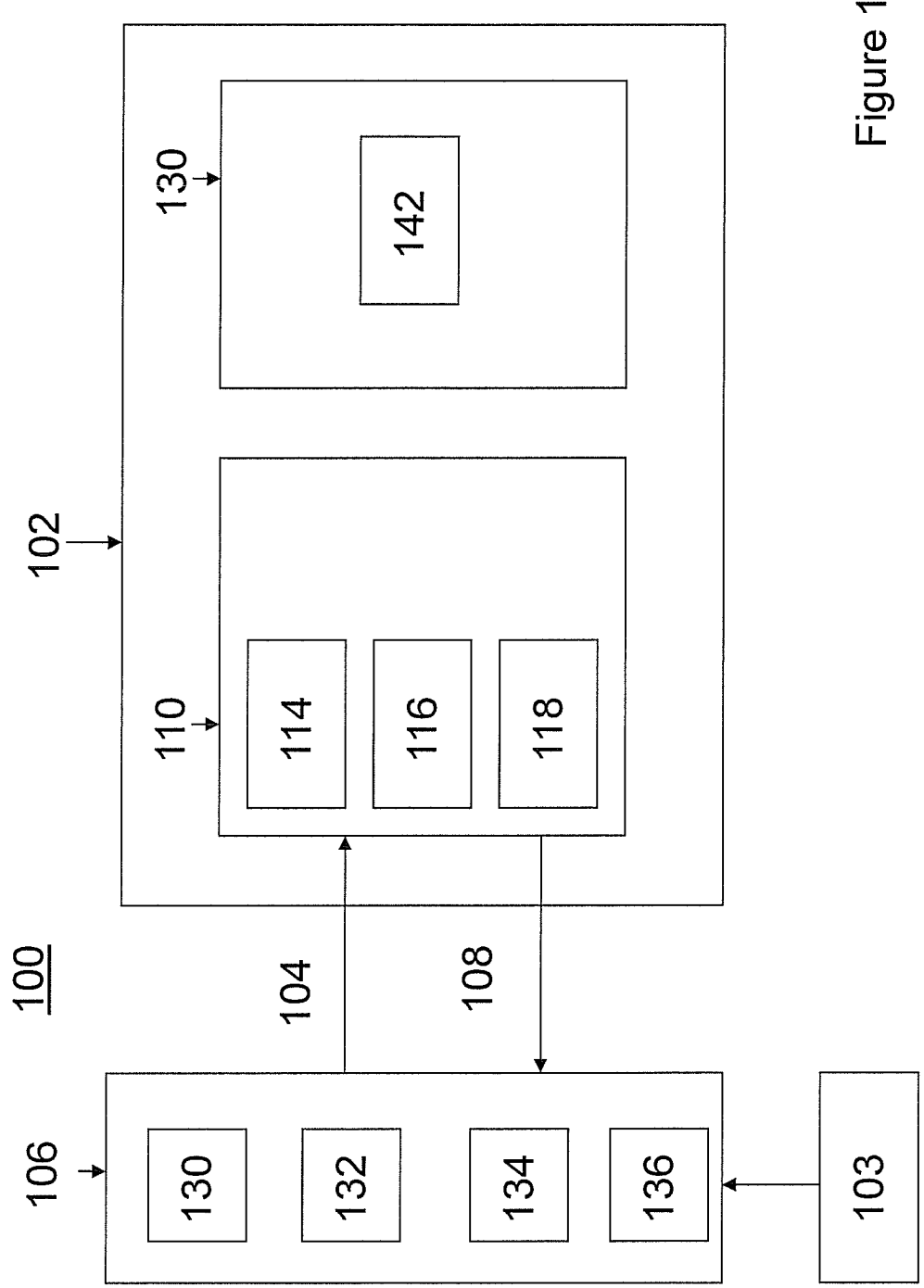
FIG. 1 is a block diagram of an example of a search system used with the disclosed technology.

The subject matter described herein relates to a prevention of invalid selections based on machine learning of user specific latency by disambiguating selections for temporally proximate content, e.g., a link that has recently changed on screen. For example, when a user begins to type a contemplated query into a search system, many search systems offer the user a list of suggested search terms based on the user's partial query. These lists can change when a user enters a new character into the query bar. When the list produces a suggested query that the user finds relevant to their contemplated query, the user can choose the relevant item from the list and the relevant item will be sent to a search system. This can be deemed as an intentional selection. However, when a list appears that contains a suggested query the user finds relevant, during the time it takes for the user to stop typing and select the relevant list item, the relevant list item can change due to latency issues and the user can unintentionally select an irrelevant or unwanted link. This brings the user to, e.g., a search results page they did not intend to visit. This can be deemed as an unintentional selection. In other implementations, the user can be brought to other types of pages, e.g., an app details page or any other type of page that uses search suggestions to lead to different types of content.

To address this problem, a machine-learning system is trained to output time-based thresholds that a client device can use as a basis of comparison to determine heuristically whether a selection by a particular user is intentional or unintentional. During training, input to the machine-learning system includes information about latency caused by the particular user and, moreover, latency caused by a device associated with the user. Latency caused by a network used by the user is factored out of the input because such latency widely varies and is thus not suitable for predicting whether a selection is intentional or unintentional.

Feedback signals to the learning machine include data indicating a length of time a user spent on a selection, measurable, for example, by the time between clicks. A short click is usually a good indication that the selection was unintentional. (A short click is one where the user spends too little time on a selection to fully read its content before backtracking. A short click is typically 2-3 seconds.) An output that resulted in a short click is probably incorrect and would require the learning machine to adjust its parameters, which task is typically iteratively performed until the learning machine consistently produces correct outputs.

Once training is complete, the time-based thresholds the learning machine outputted are sent to the client device of the user. Computing resources on the client device then use the thresholds to heuristically determine whether a selection made by the particular user is intentional or unintentional. A selection the client device has heuristically determined to be intentional is designated as a valid selection. A selection the client device has heuristically determined to be unintentional is designated as an invalid selection.

There can be more than one client device associated with the user, in which case different client devices of the user can have different time-based thresholds. Moreover, the machine learning system can be used to provide time-based thresholds for different users, as long as the data used to train the learning machine during a session for a user is particular to that user.

FIG. 1 illustrates an example search system 100 for providing a search result or ranked search results relevant to submitted queries as can be implemented in an internet, an intranet, or another client and server environment. The search system 100 is an example of an information retrieval system in which the systems, components, and techniques described below can be implemented. The search system 100 can be used, for example, to generate a single search result germane to the query or to generate ordered sets of search results.

A user 103 can interact with server 102 of the search system 100 through a client device 106. For example, the client device 106 can be any computing device where access to a search engine is available, e.g., mobile devices, tablets, computers, etc. or can be a computing device coupled to the server side 102 through a local area network (LAN) or wide area network (WAN), e.g., the Internet. In some implementations, the server 102 and the client device 106 can be one machine. For example, a user 103 can install a desktop search application on the client device 106. The client device 106 will generally include a random access memory (RAM) 130 and a processor 132.

The server 102 can include a search engine 110 and a search assistant 130. The server 102 responds to a query 104 by generating search results 108, which are transmitted through the network to the client device 106 in a form that can be presented to the user, e.g., a search results web page to be displayed in a web browser running on the client device 106.

When the query 104 is received by the search engine 110, the search engine 110 identifies resources that match the query 104. The search engine 110 can also identify a particular "snippet" or section of each resource that is relevant to the query or of the highest ranked resources that are relevant to the query. The server 102 will generally include: (1) an indexing engine 114 that indexes resources, e.g., web pages, images, or news articles on the Internet found in a corpus, e.g., a collection or repository of content, (2) an index database 118 that stores the index information, and (3) a ranking engine 116, or other software, to rank the resources that match the query 104. The indexing engine 114 can index information using traditional techniques.

Figure 2:
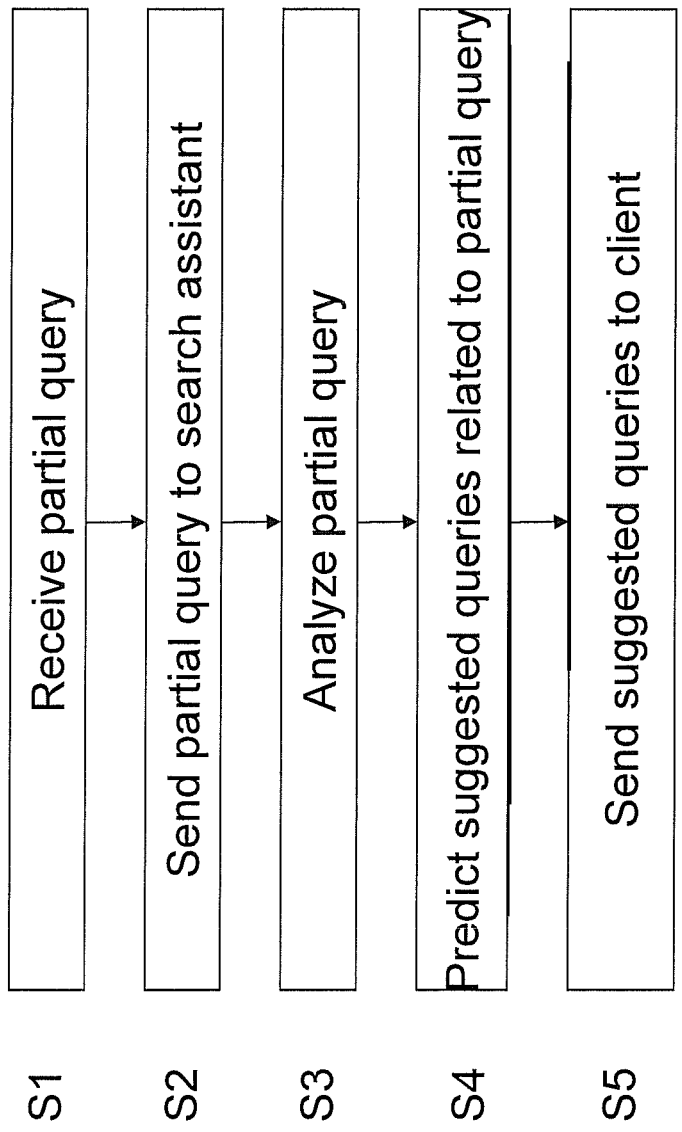
FIG. 2 is a flow chart showing an example process of suggesting queries.

The search assistant 130 provides a client device 106 with suggested search queries. The search assistant 130 can be part of the search engine 110 or can be a stand-alone component. As a user enters a search query 104, the input is monitored by the client system. As shown in FIG. 2, prior to the user signaling completion of the search query, a portion of the user's query is sent from the client system 106 to the server 102 (Step S1). The portion of the query can be a single character, a few characters, a search term, or more than one search term. The server 102 receives the partial query and sends the search query to the search assistant 130 for processing (Step S2). The search assistant 130, using a data repository containing previously searched query terms, analyzes the partial query (Step S3) and makes a prediction of what the user's contemplated query might be (Step S4). That is, the search assistant 130 attempts to anticipate queries that the user might be in the process of entering based on that partial query. The suggested queries can be sent back to the client system 106 (Step S5)

Figure 3:
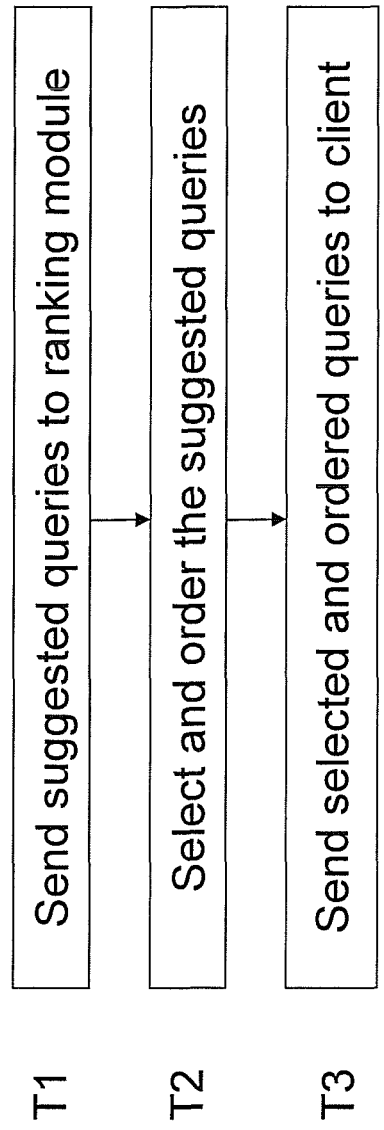
FIG. 3 is a flow chart showing an example process of ranking suggested queries.

Before the suggested queries are sent to the client, as shown in FIG. 3, the search assistant 130 could send the suggested queries to a ranking module 142 (Step T1) where the suggested queries can be selected and placed in an order based on a metric or score representative of how likely each entry is to match the user's search query (Step T2). The selected and ordered matches can be sent to the client system 106 as a list of suggested queries (Step T3). In some implementations, matching entries can be selected based on a metric or score, but are ordered based on other criteria, e.g., alphabetical order.

Figure 4:
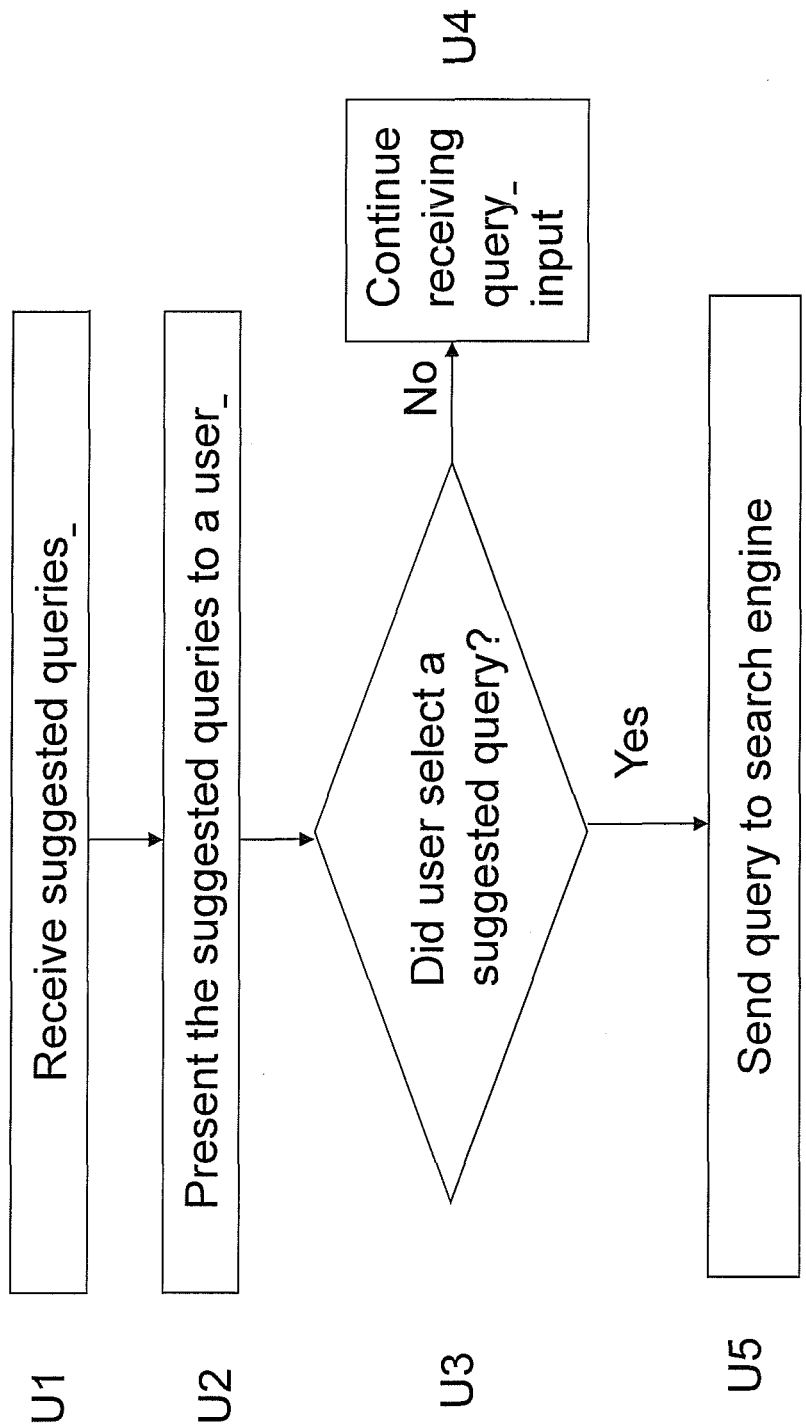
FIG. 4 is a flow chart showing an example process of presenting suggested queries.

The client, as shown in FIG. 4, receives the suggested queries (Step U1) and presents the suggested queries to a user (Step U2), e.g., the suggested search queries might be presented in a drop down menu. Regardless of the manner in which the suggested queries are presented to the user, the user may or may not select a suggested query (Step U3). If one of the suggested queries is what the user intended as the desired query, the user can select this suggested query and proceed without having to finish entering the desired query. The selected query can be sent to a search engine. (Step U5). If the suggested queries do not reflect what the user had in mind, the user can continue to enter the query and the client device can continue to receive the remainder of the desired search query. (Step U4).

If the user selects one of the suggested search queries, the suggested query is transmitted to the search engine as a search request. After search results are generated from the search request, the search results can be ranked and presented to the user for further study or, if the query was in the form of a question, the search engine can return an answer to the query question.

The search assistant 130 can be used on all computing devices where access to a search engine is available, e.g., mobile devices, tablets, laptops, computers, etc. but can play a particularly important role on mobile devices where small screen size makes typing a burden and users often opt to use the suggested queries instead of typing their full query.

In the above environments, update speed or latency of the suggested queries is dependent on the quality of network connection and the latency of the client device, e.g., latency associated with processing times of hardware and software of the client device, so any lag between updates is fairly unpredictable, especially on mobile data connections where a connection speed can be dependent on a location. An update of a search suggestions list can take anywhere between a few hundred milliseconds up to a few seconds. A common user problem occurs during a time interval when a user decides to use a search selection and manually indicates their choice. During this interval, as the user indicates their choice, the choices can be updated and the user can unintentionally indicate a suggestion they did not intend to choose. This incorrect indication takes the user to an incorrect results page and wastes the user's time. The user can be forced to press the backpage button to return to the search page, and often loses his partially-typed search query.

This problem also presents itself any time webpage content changes dynamically in a way that's too abrupt for the user to react before triggering a selection on the wrong content, for example, in a news webpage where top stories are shown in a slideshow and change every few seconds or on a search results page that has advertising links changing every few seconds. A user may find a story or ad of interest but the link dynamically changes as the user makes a desired selection.

In order to disambiguate selections on any dynamically changing content, the system can analyze user behavior to determine which selections are intentional versus unintentional and establishes an average reaction-time profile that is specific to each user and possibly for each of the user's devices, e.g., the user's profile can be different for her smartphone as opposed to her laptop. Please note that network and equipment latency may contribute to the update speed of the suggested queries list but these latencies can be factored out of the reaction-time profile. That is, regardless of the latency source, the disclosed technology focuses on a time frame between a suggested query being presented on a client device and the client device receiving a selection input for a suggested query. For example, if a suggested query list was presented on a client device for five or more seconds, a received selection of a suggested query from the list is most likely intentional because most, if not all, users can react to a suggestion list that is presented for five or more seconds. But if a suggested query list was presented on a client device for $1/100^{th}$ of a second most likely a received input selection based on that suggested query list was unintentional because most, if not all users, cannot react to an update that was $1/100^{th}$ of a second.

In practice it was found that users have extremely different reaction times and a single global solution would not counterbalance the above situations. Therefore, a need exists for a user-specific profile calculating threshold times at which a selection is intentional specific to each user and each of the user's devices, e.g., a user may have a quicker reaction time using a touch screen as opposed to using a mouse connected to a computer. There are two different dimensions of reaction time that will be specific to each user: (i) the time it takes a user to mentally register and react to a content refresh that happens onscreen, and (ii) the time it takes a user to manually indicate a suggested search query. Using machine learning techniques, the system builds a profile to determine each user's reaction time. For background, a machine learning system can take inputs and signals and train on these inputs and signals to understand and predict probabilities for certain outcomes. The probabilities are then tested against known results. If the systems probabilities are incorrect, the system continues to train on more received input and signals. If after some period of time, the probabilities are consistently correct, the system can use these probabilities to form a determination module. Now when the determination module receives a set of unknown inputs and signals, it can determine the probability, with some accuracy, that the inputs and signals have a high confidence of a certain outcome. For example, an intentional selection is one in which it can be determined to be highly probable that it represented an intended user selection and an unintentional selection can be determined to be highly probable that it does not represent an intended user selection. These determinations can be based on user specific time stamps and time thresholds. The time thresholds can be generated by a machine learning system using user specific latency signals and time stamp inputs. These probabilities can be updated on an on-going basis to enhance the accuracy of the determination module over time, as will be described more fully below.

In some implementations, the system, on the client side, acts as a recording device for the system in that it records actions that demonstrate device and user behavior. Actions include, e.g., (1) when characters are entered into the query box by a user, (2) when search suggestions appear and are updated on a client, (3) when a user selects a search suggestion, (4) when a user performs an action signifying an unintentional selection, e.g., using a backpage button or a home page button immediately or within a certain time frame after receiving a results page and (5) when a user selects a link from the results page.

In some implementations, an action can begin when a user types a first character into a query box and ends after a search query is sent to a search engine. In other implementations, for example, in a search system that is not part of traditional web search engines, an action can be app search engine linking searches to an app details page, or typing the first letters of an airport into a flight finder and having it auto-complete a list of several possible airports. These actions can be temporarily stored on the client side as a table along with a timestamp marking a time for each action. Also, as additional characters are entered in the query box and the list of suggested search queries are updated, the system can keep in memory the previous suggestions list and their respective timestamps as well as the newest suggestions list and its timestamp.

By providing these specific actions and timestamps, the machine learning system on the server side can "learn" which selections were invalid and which selections were valid. This is based on a function of time vs. a probability of the selection being unintentional or intentional. That is, if a selection choosing a suggested query is received more than, e.g., five seconds, after a last list update, the selection has a high probability of being intentional but if a selection is received under, e.g., ½ second, the selection has a high probability of being unintentional. In other words, the machine learning system can learn the differences between an unintentional selection and an intentional selection by distinguishing "short clicks" and "long clicks." That is, an unintentional selection can be associated with a "short click" where after the search results page appears the user immediately returns to the previous query page or a "short click" can be determined using a previously-determined threshold, e.g., a user stays on the results page for less than ten seconds. An intentional selection can be associated with a "long click" where after the search results page appears the user navigates the results page or a "long click" can be determined using a previously-determined threshold, e.g., a user stays on a results page for more than 10 seconds. These previously-determined "short-click" and "long click" thresholds can be established by another machine learning techniques trained to learn the difference between "long clicks" and "short clicks."

When a sufficient amount of training data is received by the machine learning system, e.g., N amount of actions, an invalid-selection module can be created for a specific user for a specific device. The invalid-selection module can indicate the likelihood that a selection was intentional as a function of the amount of time that elapsed between the search suggestion updating and user selecting a search suggestion query. Once an invalid-selection module is established, the invalid-selection module can be sent to the client side and stored. Please note that after a certain number of invalid-selection modules are established additional invalid-selection modules can be created using a user's profile and finding an existing invalid-selection module of a similarly-situated user. This existing invalid-selection module can be used as the new user's existing invalid-selection module.

Figure 5:
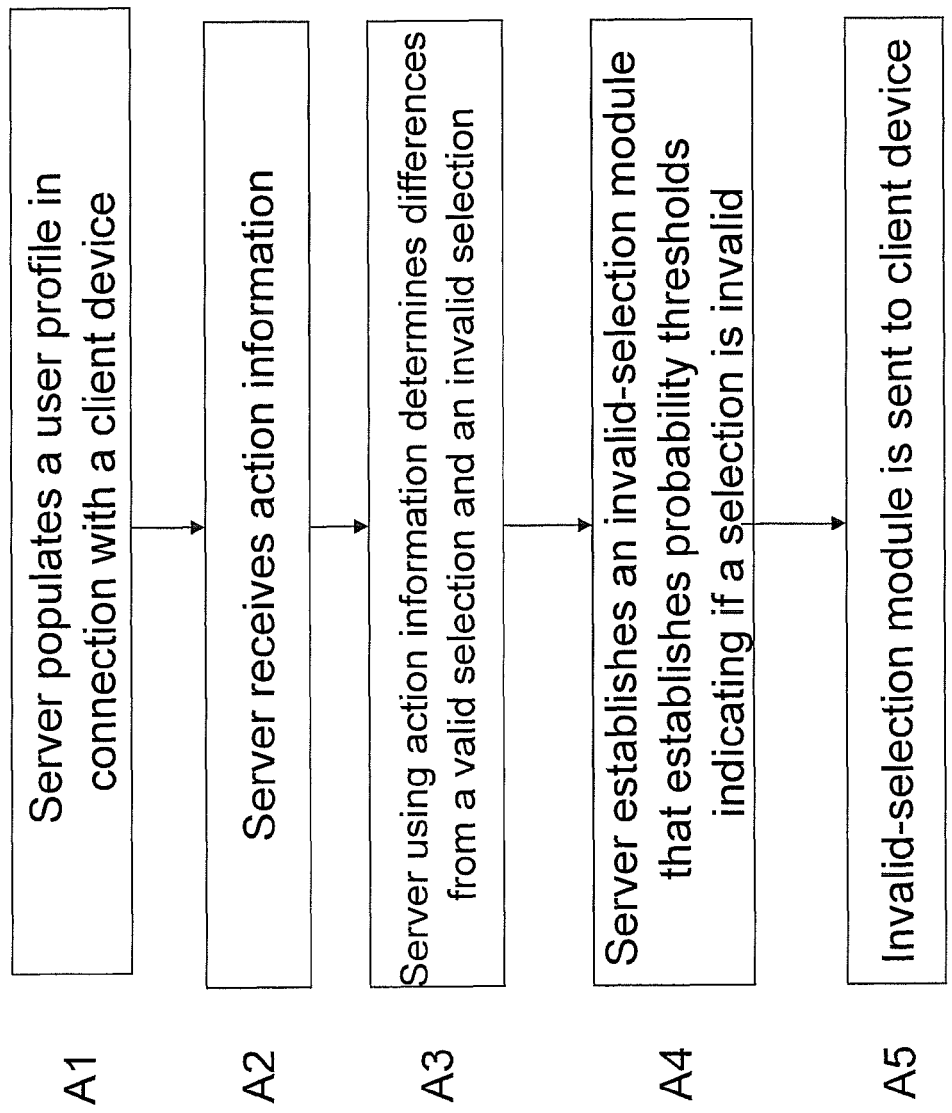
FIG. 5 is a flow chart showing an example process of establishing an unintentional-selection module.

As shown in FIG. 5, a server populates a user profile in connection with a specific client device. (Step A1). The user profile can be imported from a social network, created by answering a list of questions or some other method. The user profile can also include a user's age, a type of device, a type of connection, a network carrier, a user location, a signal strength and any other information that is useful for building an invalid-selection module. The server also receives information, e.g., action information from a client device. The action information can include (1) a plurality of time stamps indicating times between updates for every dynamic list of search suggestions as received by the specific client device, (2) a plurality of time stamps indicating each time a link is chosen from the dynamic list of search suggestions and (3) a plurality of time stamps indicating each time a back-page link is used after the link is chosen from the dynamic list of search suggestions. (Step A2). Using a computer-implemented learning system, the server can determine differences from an invalid selection and a valid selection. (Step A3). That is, as described above, a valid selection occurs when a user chooses a desired suggested search query from a suggestions list and a selection is invalid when a user tries to choose a desired search suggestion from a suggestions list but the list is updated before the user can make the desired choice. The computer-implemented learning system learns the difference between the intentional and unintentional selections by analyzing a time frame between a suggested query being presented on a client device and the client device receiving a selection input for a suggested query. Once learned, the server can establish an invalid-selection module that establishes probability thresholds indicating if a selection is intentional or unintentional. (Step A4). This module is sent and loaded onto the specific client device. (Step A5)

This invalid-selection module runs on the client side so that the client device can (1) replace selections on search suggestions that have a high probability of being unintentional, e.g., 90% probability that selection was invalid, the time threshold for an invalid selection for a specific user can be, e.g., any time interval less than 0.5 seconds or some other time interval specific to the user, (2) accept selections on search suggestions that have a high probability of being intentional, e.g., 90% probability that selection was valid, the time threshold for a valid selection for a specific user can be, e.g., any time interval greater than 2 seconds or some other time interval specific to the user and/or (3) display to the user two choices for any selection that falls within a pre-defined threshold, e.g., a range between 0.5 and 2 seconds, and cannot predict the user's intention, e.g., any amount of time that falls between a high probability of being intentional vs. a high probability of being unintentional. In this last case, the client device can signal the user that it has ignored the selection, and can present the user with a box that allows the user the choice of either clicking on the last updated search suggestion or the one that immediately preceded the last updated search suggestion.

As described above, in some implementations, the thresholds can be a range of latency times where any time that fits in the range satisfies the threshold for an invalid selection and anything that falls outside the range is a valid selection. In some implementations, the threshold can be a single latency point, e.g., 3 seconds, and not satisfying the threshold can mean meeting or exceeding the latency point for a valid selection, e.g., 3 or more seconds, and satisfying the threshold can mean being short of the latency point for an invalid selection, e.g., less than 3 seconds. In some implementations, the thresholds can be a range of latency times, e.g., 1 to 3 seconds and not satisfying the threshold can mean meeting or exceeding the upper latency point range for a valid selection, e.g., 3 or more seconds, satisfying the threshold can mean being below the lower latency point range for an invalid selection, e.g., at or less than 1 second and an indeterminable selection is one that falls within the latency point range, e.g. more than 1 second but less than three seconds.

Figure 6:
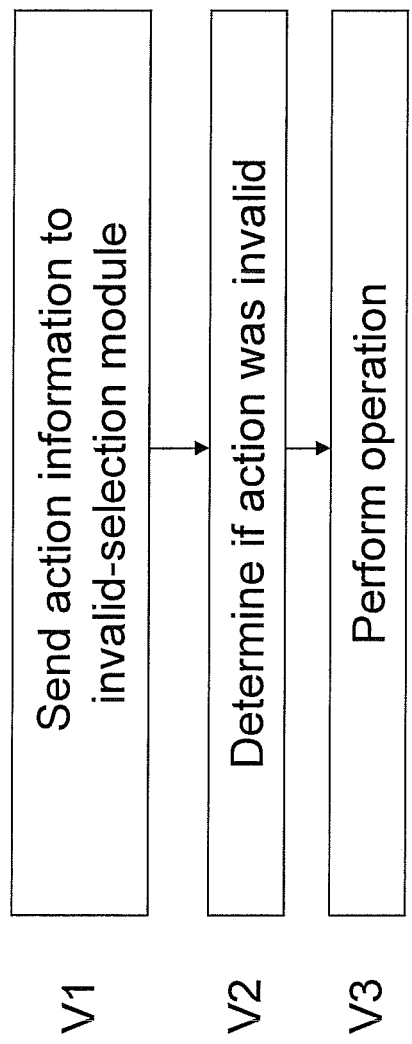
FIG. 6 is a flow chart showing an example process of utilizing an unintentional-selection module.

As shown in FIG. 6, for each action that occurs, e.g., each time a user selects a query from a suggested query list, the amount of time that elapsed between (i) search suggestions updating onscreen and (ii) the user selection, the time frame between these two actions are sent to an invalid-selection module (Step V1). For any amount of time [t] that has elapsed between an on-client content update and a selection action, a user-specific probability is produced to predict if the selection action was unintentional (Step V2). Based on the probability, the client device can customize each user's search suggestions experience to minimize unintentional selections (Step V3). For example, (1) any time a user clicks on a recently-updated search suggestion that has >[x]% probability, e.g. >90% chance, of being invalid based on the user's profile, the selection is replaced with the search suggestion that temporally preceded it, (2) any time a user clicks on a recently-updated search suggestion that has <[x]% probability, e.g., <10% chance, of being valid based on the user's profile, the click is accepted, no visual cue may be indicated and the suggested query is sent to search engine, and (3) any time a user clicks on a recently-updated search suggestion that has a probability between (i) >[x]% probability of being invalid and (ii)<[x]% probability of being valid, a choice box can be presented to the user, as described above.

In some implementations, a visual cue can be used to indicate that the click was rejected as unintentional, for example, the results page can go momentarily grey. In another implementation, any time a click is accepted, the search suggestion that was previously presented can be added to the bottom of the results page and a visual effect can be utilized to draw attention to it, e.g., a yellow fade effect. Any time a click is replaced, the search suggestion that was clicked can also be added to the bottom of the results page and a visual effect can be utilized to draw attention to it, e.g., a blue fade effect. In either case, the user's reaction time may have been faster or slower than expected and this feature allows the user to perform the search that they most likely intended to perform. This feature also can add feedback to the system which can be sent to the server side to fine tune a user's unintentional selection module. Additional feedback signals can also be sent to the server side to adjust a user's unintentional selection module as needed over time, e.g., client device updates, network updates and increasing age of user. In some implementations, in order to receive feedback that an acceptance or rejection of a selected suggested query was wrong, the system can implement a time delay before executing any acceptance or rejection, so that a user could have time to contradict the acceptance or rejection, e.g., click on the "faded-in" alternate choice. In other words, a delay can be added so the user would have a chance to see the alternate choice that has been presented and choose it instead thereby providing feedback to the system.

Figure 7:
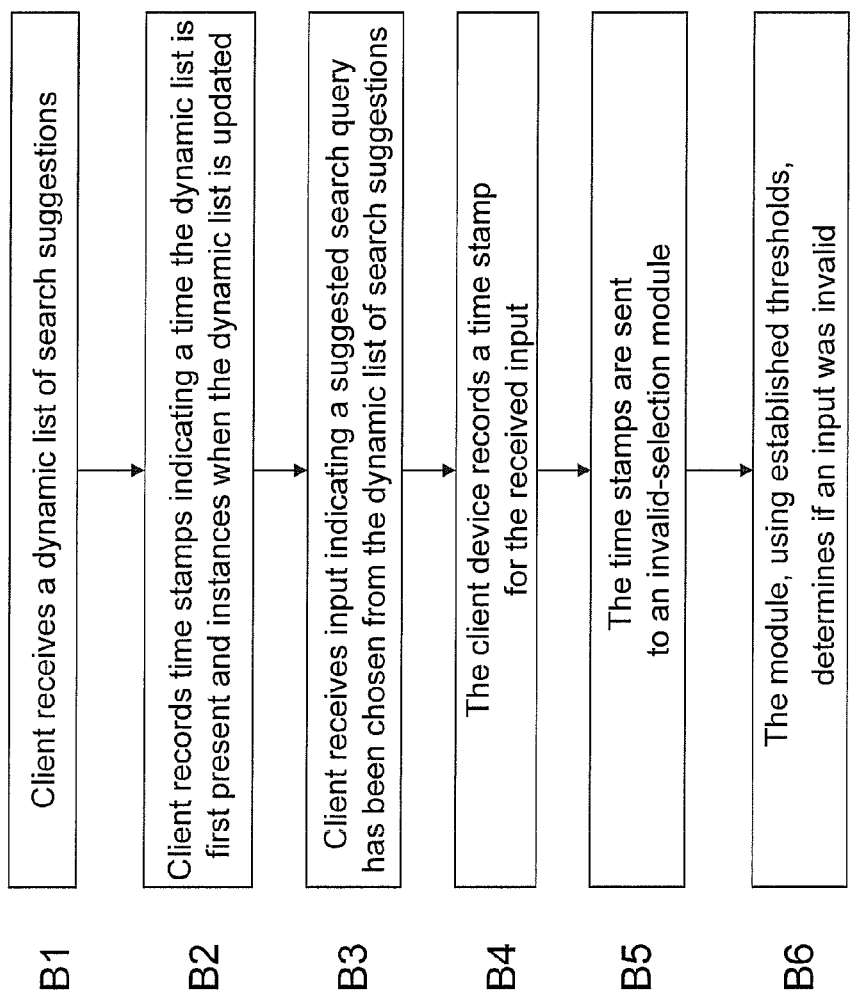
FIG. 7 is a flow chart showing an example process of utilizing an unintentional-selection module.

As shown in FIG. 7, the client receives a dynamic list of search suggestions. (Step B1). The client device records time stamps indicating a time the dynamic list is first presented and instances when the dynamic list is updated. (Step B2). The client device also receives an input indicating that a suggested search query has been chosen from the dynamic list of search suggestions. (Step B3). The client device records a time stamp for a time the input is received. (Step B4). The time stamps with their associated actions are sent to an invalid-selection module (Step B5). The module, using established thresholds, determines if an input was unintentional. (Step B6).

Figure 8:
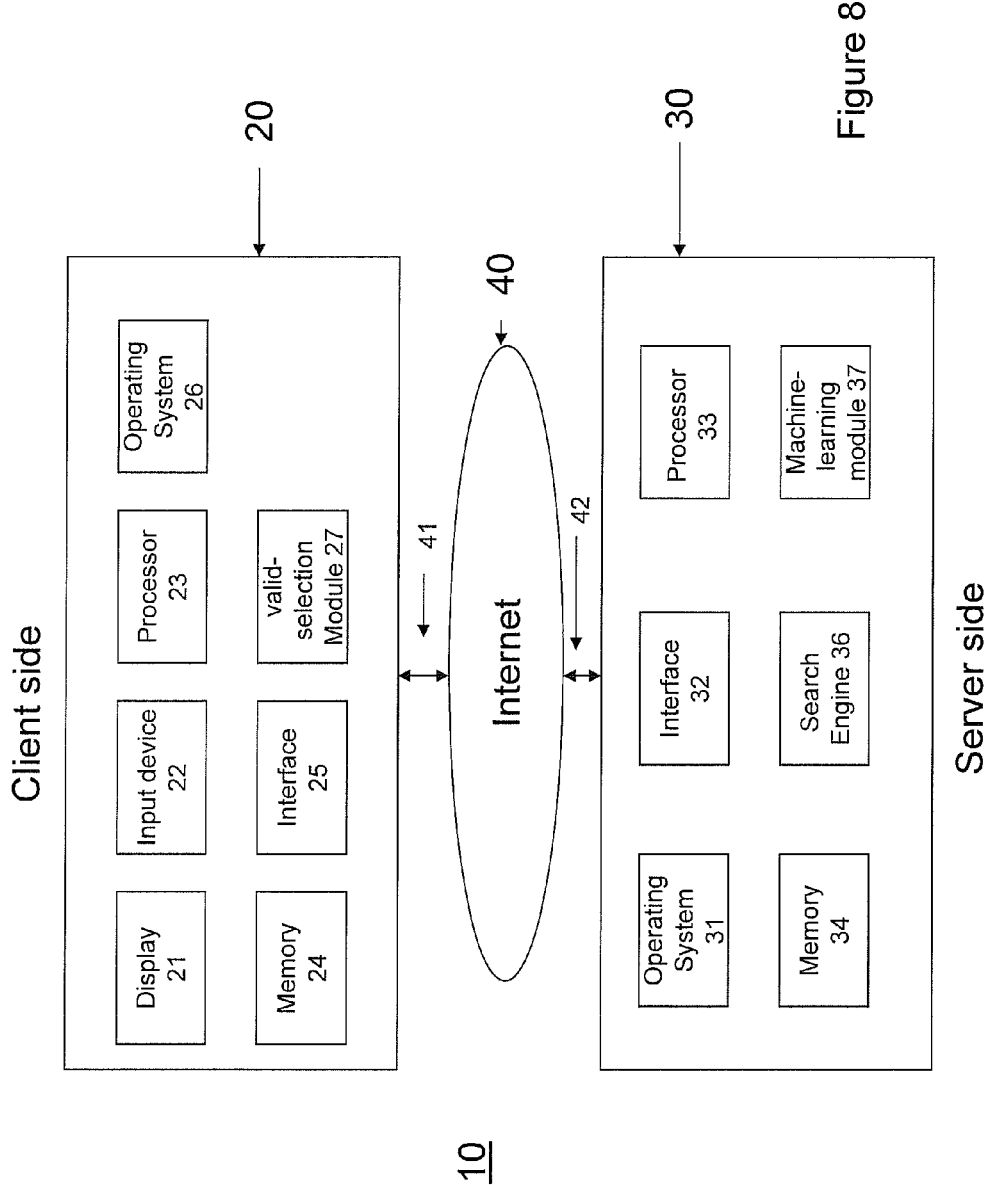
FIG. 8 is a block diagram of an example of a system used with the disclosed technology.

FIG. 8 is a schematic diagram of an example of a search system 1. The system 1 includes one or more processors 23, 33, one or more display devices 21, e.g., CRT, LCD, one or more interfaces 25, 32, input devices 22, e.g., touchscreen, keyboard, mouse, scanner, etc., and one or more computer-readable mediums 24, 34. These components exchange communications and data using one or more buses 41, 42, e.g., EISA, PCI, PCI Express, etc. The term "computer-readable medium" refers to any non-transitory medium 24, 34 that participates in providing instructions to processors 23, 33 for execution. The computer-readable mediums 24, 34 further include operating systems 26, 31.

The operating systems 26, 31 can be multi-user, multiprocessing, multitasking, multithreading, real-time, near real-time and the like. The operating systems 26, 31 can perform basic tasks, including but not limited to: recognizing input from input devices 22; sending output to display devices 21; keeping track of files and directories on computer-readable mediums 24, 34 and 50, e.g., memory or a storage device; controlling peripheral devices, e.g., disk drives, printers, etc.; and managing traffic on the one or more buses 41, 42. The operating systems 26, 31 can also run algorithms associated with the system 10.

The network communications code can include various components for establishing and maintaining network connections, e.g., software for implementing communication protocols, e.g., TCP/IP, HTTP, Ethernet, etc.

Moreover, as will be appreciated, in some implementations, the system 1 of FIG. 8 is split into a client-server environment 20, 30 communicatively connected over the internet with connectors 41, 42, where one or more server computers 30 include hardware as shown in FIG. 8 and also code for building, updating and verifying profiles on a computer network, code for machine learning techniques, code for analyzing data and code for making determinations and where one or more client computers 20 include hardware as shown in FIG. 8 and also include code for building, updating and verifying profiles on a computer network, code for analyzing data and code for making determinations.

Implementations of the subject matter and the operations described in this specification can be done in electronic circuitry, or in computer software, firmware, or hardware, including the structures disclosed in this specification and their structural equivalents, or in combinations of one or more of them. Implementations of the subject matter described in this specification can be done as one or more computer programs, e.g., one or more modules of computer program instructions, encoded on a computer storage media for execution by, or to control the operation of, data processing apparatus, 27, 37. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be, or can be included in, a computer-readable storage device, a computer-readable storage substrate, a random or serial access memory array or device, or a combination of one or more of them.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or combinations of them. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, e.g., a virtual machine, or a combination of one or more of them. The apparatus and execution environment can realize various different computing model infrastructures, e.g., web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer comprise a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, thought or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network, e.g., the Internet, and peer-to-peer networks, e.g., ad hoc peer-to-peer networks.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a client device, e.g., for purposes of displaying data to and receiving user input from a user interacting with the client device. Data generated at the client device, e.g., a result of the user interaction, can be received from the client device at the server.

While this specification contains many specific implementation details, these should not be construed as limitations on the scope of the disclosed technology or of what can be claimed, but rather as descriptions of features specific to particular implementations of the disclosed technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. In some cases, the actions recited in the claims can be performed in a different order and still achieve desirable results. Moreover, the separation of various system components in the implementations described above should not be understood as requiring such separation in all implementations, and it should be understood that the described program components and systems can generally be integrated together in a single software product or packaged into multiple software products.

The foregoing Detailed Description is to be understood as being in every respect illustrative, but not restrictive, and the scope of the disclosed technology disclosed herein is not to be determined from the Detailed Description, but rather from the claims as interpreted according to the full breadth permitted by the patent laws. It is to be understood that the implementations shown and described herein are only illustrative of the principles of the disclosed technology and that various modifications can be implemented without departing from the scope and spirit of the disclosed technology.

The invention claimed is:

1. A method comprising the steps of:
recording time stamps indicating a time a dynamic list of search suggestions is first presented and instances when the dynamic list is updated;
receiving an input selection, the input selection indicating that a suggested search query has been chosen from the dynamic list of search suggestions;
recording a time stamp for the input selection; and
determining whether or not the input selection is an invalid selection, the input selection being determined as the invalid selection whenever a difference between a time stamp for presenting a most recent dynamic list update and the time stamp of the input selection satisfies a user-specific threshold, the user-specific threshold being calculated with a machine learning system trained using user-specific latency times as training data, wherein each user-specific latency time is a difference between a time stamp of a respective previous most recent dynamic list update before a respective corresponding input selection and a time stamp of the respective corresponding user input selection.

2. The method of claim 1 further comprising the step of:
if the selection was invalid, replacing the suggested search query with a previously suggested search query.

3. The method of claim 1 wherein the user-specific threshold is calculated using device-specific latency times as training data.

4. The method of claim 1 further comprising the step of:
if the selection is indeterminable, presenting the suggested search query and a previously suggested search query.

5. The method of claim 1 wherein the user-specific threshold is a function of time versus a probability of being invalid.

6. A system comprising:
one or more processors;
one or more non-transitory computer-readable storage mediums containing instructions configured to cause the one or more processors to perform operations including:
recording time stamps indicating a time a dynamic list of search suggestions is first presented and instances when the dynamic list is updated;
receiving an input selection, the input selection indicating that a suggested search query has been chosen from the dynamic list of search suggestions;
recording a time stamp for the input selection; and
determining whether or not the input selection is an invalid selection, the input selection being determined as the invalid selection whenever a difference between a time stamp for presenting a most recent dynamic list update and the time stamp of the input selection satisfies a user-specific threshold, the user-specific threshold being calculated with a machine learning system trained using user-specific latency times as training data, wherein each user-specific latency time is a difference between a time stamp of a respective previous most recent dynamic list update before a respective corresponding input selection and a time stamp of the respective corresponding user input selection.

7. The system of claim 6 including the step of:
if the selection was invalid, replacing the suggested search query with a previously suggested search query.

8. The system of claim 6 wherein the user-specific threshold is calculated using device-specific latency times as training data.

9. The system of claim 6 including the step of:
if the selection is indeterminable, presenting the suggested search query and a previously suggested search query.

10. The system of claim 6 wherein the user-specific threshold is a function of time versus a probability of being invalid.

11. A computer-program product, the product tangibly embodied in a non-transitory machine-readable storage medium, including instructions configured to cause a data processing apparatus to:
record time stamps indicating a time a dynamic list of search suggestions is first presented and instances when the dynamic list is updated;
receive an input selection, the input selection indicating that a suggested search query has been chosen from the dynamic list of search suggestions;
record a time stamp for the input selection; and
determine whether or not the input selection is an invalid selection, the input selection being determined as the invalid selection whenever a difference between a time stamp for presenting a most recent dynamic list update and the time stamp of the input selection satisfies a user-specific threshold, the user-specific threshold being calculated with a machine learning system trained using user-specific latency times as training data, wherein each user-specific latency time is a difference between a time stamp of a respective previous most recent dynamic list update before a respective corresponding input selection and a time stamp of the respective corresponding user input selection.

12. The computer-program product of claim 11, further including instructions configured to cause a data processing apparatus to:
if the selection was invalid, replace the suggested search query with a previously suggested search query.

13. The computer-program product of claim 11 wherein the user-specific threshold is calculated using device-specific latency times as training data.

14. The computer-program product of claim 11, further including instructions configured to cause a data processing apparatus to:
if the selection is indeterminable, present the suggested search query and a previously suggested search query.

15. A method comprising the steps of:
establishing a user profile in connection with a specific client device;
receiving a plurality of time stamps indicating times between updates for every dynamic list of search suggestions as received by the specific client device;
receiving a plurality of time stamps indicating each time a link is chosen from the dynamic list of search suggestions;
receiving a plurality of time stamps indicating each time an action signifying an invalid selection is performed after the link is chosen from the dynamic list of search suggestions;
using a computer-implemented learning system to determine a user-specific threshold for an invalid selection, the user-specific threshold for the invalid selection being a function of time versus a probability of being invalid, the function of time being a difference between a time stamp for presenting a most recent dynamic list update and a time stamp for an input selecting a search suggestion, the input being invalid when the difference satisfies the user-specific threshold;
establishing an invalid-selection module based upon attributes learned by the system, the module determining a probability a selection is invalid; and
sending the invalid-selection module to the specific client device.

16. The method of claim 15 further comprising the step of:
receiving at least one of a user's age, a type of device, a type of connection, a network carrier, a user location, and a signal strength.

17. A system comprising:
one or more processors;
one or more non-transitory computer-readable storage mediums containing instructions configured to cause the one or more processors to perform operations including:
establishing a user profile in connection with a specific client device;
receiving a plurality of time stamps indicating times between updates for every dynamic list of search suggestions as received by the specific client device;
receiving a plurality of time stamps indicating each time a link is chosen from the dynamic list of search suggestions;
receiving a plurality of time stamps indicating each time an action signifying an invalid selection is performed after the link is chosen from the dynamic list of search suggestions;
using a computer-implemented learning system to determine a user-specific threshold for an invalid selection, the user-specific threshold for the invalid selection being a function of time versus a probability of being invalid, the function of time being a difference between a time stamp for presenting a most recent dynamic list update and a time stamp for an input selecting a search suggestion, the input being invalid when the difference satisfies the user-specific threshold;
establishing an invalid-selection module based upon attributes learned by the system, the module determining a probability a selection is invalid; and
sending the invalid-selection module to the specific client device.

18. The system of claim 17 the operations further comprising:
receiving at least one of a user's age, a type of device, a type of connection, a network carrier, a user location, and a signal strength.

19. A computer-program product, the product tangibly embodied in a non-transitory machine-readable storage medium, including instructions configured to cause a data processing apparatus to:
establish a user profile in connection with a specific client device;
receive a plurality of time stamps indicating times between updates for every dynamic list of search suggestions as received by the specific client device;
receive a plurality of time stamps indicating each time a link is chosen from the dynamic list of search suggestions;
receive a plurality of time stamps indicating each time an action signifying an invalid selection is performed after the link is chosen from the dynamic list of search suggestions;

use a computer-implemented learning system to determine a user-specific threshold for an invalid selection, the user-specific threshold for the invalid selection being a function of time versus a probability of being invalid, the function of time being a difference between a time stamp for presenting a most recent dynamic list update and a time stamp for an input selecting a search suggestion, the input being invalid when the difference satisfies the user-specific threshold;

establish an invalid-selection module based upon attributes learned by the system, the module determining a probability a selection is invalid; and send the invalid-selection module to the specific client device.

20. The computer-program product of claim 19, further including instructions configured to cause a data processing apparatus to:

receive at least one of a user's age, a type of device, a type of connection, a network carrier, a user location, and a signal strength.

* * * * *